Feb. 1, 1944.　　　　　C. PICINICH　　　　2,340,556
COSMETIC STICK HOLDER
Filed Nov. 18, 1941
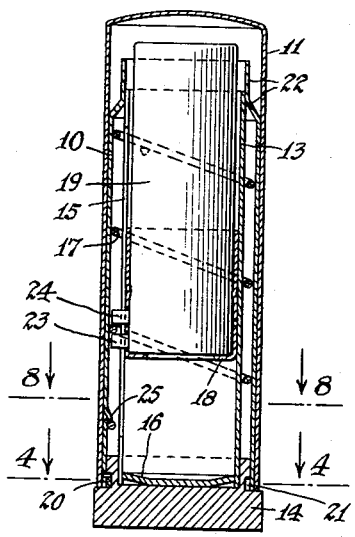
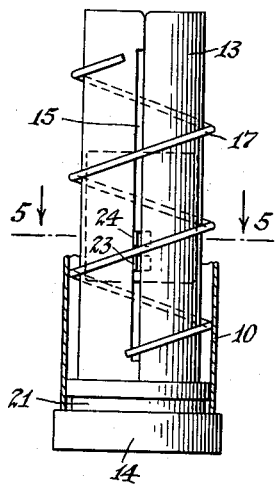
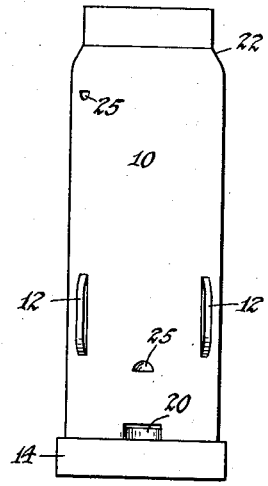
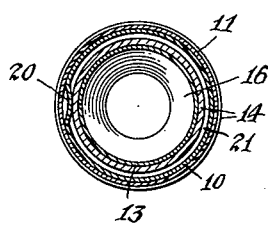
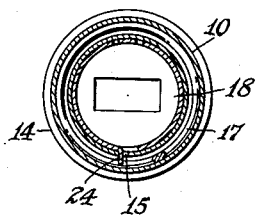
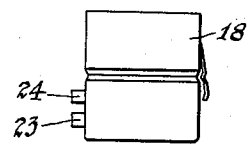
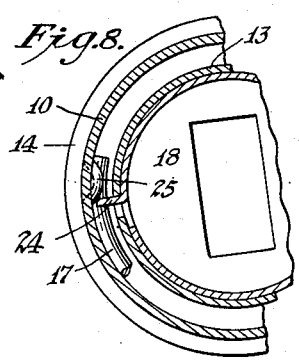
INVENTOR
CHARLES PICINICH
BY
ATTORNEY Patented Feb. 1, 1944

2,340,556

UNITED STATES PATENT OFFICE 2,340,556

COSMETIC STICK HOLDER

Charles Picinich, Moosup, Conn., assignor to Majestic Metal Specialties, Inc., Moosup, Conn., a corporation of Connecticut Application November 18, 1941, Serial No. 419,534

4 Claims. (Cl. 206—56)

This invention relates to holders for cosmetic sticks such as lipsticks, and has for its object to provide an attractive device for this class which is not as expensive to manufacture as some of the prior devices have been. Another object is to provide a simple construction which serves all the requirements of such a device. A further object is to position a helical spring wire in the device so that the wire may function as a screw thread without going to the expense of making the type of thread heretofore commonly used, and yet the wire may be secured against accidental displacement.

Referring to the drawing

Fig. 1 is a longitudinal section through one embodiment of this invention.

Fig. 2 shows the device of Fig. 1 with the cover removed and the outer casing partly broken away.

Fig. 3 is a longitudinal view of the device of Fig. 1 with the cover removed and showing the outside of the outer casing.

Fig. 4 is a section on the line 4—4 of Fig. 1.

Fig. 5 is a section on the line 5—5 of Fig. 2.

Fig. 6 shows the carrier removed from the holder.

Fig. 7 is a disc deformed at the base of the inner casing to hold it secured to the actuator.

Fig. 8 is a section on the line 8—8 of Fig. 1.

The outer casing 10 is provided with a removable cover 11 which is of slightly greater length than the outer casing and adapted to enclose the outer casing. To provide a good yieldable fit for retaining the cover in position the outer casing is provided with several stamped out friction lugs or projections 12. The inner casing 13 is preferably rolled rather than drawn and provided with a longitudinal slot 15. The actuator 14 is fixed to the lower end of the inner casing 13 by means of a deformed plate 16 which is placed at the bottom of the inner casing contiguous the actuator. Pressure applied to the plate 16 spreads and enlarges the diameter until the lower end of the inner casing is expansively clamped within the recess shown in the actuator. Between the inner and outer casings is located a helical spring wire 17 which is preferably held contiguous the inner face of the outer casing by the resiliency of the spring, the spring when removed being of slightly larger diameter than the inside of the outer casing. A carrier 18 for the cosmetic or other stick of material 19 has a pair of spaced lugs 23 and 24 stamped from its side to receive the spring wire between these lugs. The outer casing 10 is provided with an inturned lug 20 adjacent its base for reception in the groove 21 of the actuator. By pressing the lug 20 into the groove the outer casing is held in place contiguous the actuator yet the actuator is permitted to rotate with the inner casing relatively to the outer casing. Adjacent its upper edge the outer casing is formed with reduced neck portion 22 which serves to provide a guide for the inner casing.

To provide an abutment for the lower and upper end of the spring wire 17, lugs 25 are stamped in on each side of the outer casing. These lugs also have the purpose of positioning the two opposite ends of the spring wire. Also as shown in Figures 3 and 8, they constitute stops to limit rotation of the projection or lugs 23 and 24. The stops for the carrier do not tend to distort the spring wire or the spacing of its convolutions.

As shown in Fig. 6, the carrier has a stamped out tongue portion to provide a satisfactory fit within the inner casing.

To assemble this device the spring is first placed within the outer casing by coiling the spring to a diameter smaller than the inside of the outer casing, longitudinally inserting the spring and positioning it with respect to the first or lower lug 25 and the reduced end portion 22. When the spring is released its natural resiliency holds it in place contiguous the inside of the outer casing. The inner casing 13 is then rolled and inserted into the actuator recess, the plate 16 expansively holding the inner casing contiguous the walls of the recess in the actuator 14. The carrier 18 for the cosmetic stick is then put in position so that when the inner casing is inserted into the outer casing the space between the lugs 23 and 24 may receive a portion of the spring. The outer casing is held longitudinally fixed with respect to the actuator 14 by the stamped in lug 20 engaging the groove 21 in a manner to allow rotation of the outer casing 10 with respect to the actuator.

I claim:

1. A lipstick holder comprising in combination an outer casing, a cover therefor, a rotatable inner casing having a longitudinal slot therein, an actuator at the base of said casings and secured to the inner casing for rotating the same from outside the outer casing, a helical spring wire compressed by the outer casing to a diameter less than said spring occupies when free and removed from said outer casing, whereby said spring wire is frictionally secured to the outer casing between said casings, a carrier within and rotatable with the inner casing, a projection from the carrier, extending through the inner casing slot and adapted to engage said wire above and below it for longitudinally displacing the carrier on movement of said actuator.

2. A cosmetic stick holder comprising an outer casing, a cover, an inner casing having a longitudinal slot, an actuator for producing relative rotation between said casings, a helical spring wire between said casings and fixed with respect to the outer casing, a carrier within the inner casing, a projection from the carrier extended through the slot in the inner casing, and shaped to cooperate with said wire for longitudinally moving the carrier on relative rotation between the casings, and inturned lugs on the inside of the outer casing against each of which said projection is adapted to abut as a stop and an end of the spring wire abuts to maintain the wire in position, the resiliency of said wire tending to hold it in place against the inner surface of the outer casing.

3. A stick holder comprising an outer casing, a removable cover therefor, an inner casing having a longitudinal slot, an actuator for producing relative rotation between the casings, a helical spring wire between said casings and fixed with respect to the outer casing, a carrier within the inner casing, a projection from the carrier within the inner casing, a projection from the carrier extended through the longitudinal slot in the inner casing and shaped to cooperate with said wire for longitudinally moving the carrier on relative rotation between the casings, and two inturned lugs on the inside of the outer casing against which the two ends of the spring abut to maintain the wire in position, the resiliency of said wire tending to hold it in place against the inner surface of the outer casing, and said lugs constituting stops to limit rotation of said projection.

4. In a toilet stick container of the type having an inner and outer casing, an actuator for rotating the inner casing, a carrier slidable within the inner casing for ejecting and retracting stick material, a helical spring wire between said casings, the inner casing being provided with an elongated slot through which projects a connection from the carrier for sliding along the wire as said inner casing is rotated, and means for securing the other end of said wire to the outer casing against longitudinal movement relative thereto, the improvement for securing intermediate portions of said spring relative to the outer casing which comprises said spring being compressed and held against the inner surface of the outer casing by expansive stress within the spring whereby the spring convolutions are held in frictional engagement with said outer casing, and said means for securing the outer end of the wire to the outer casing also being adapted to limit rotation of the carrier without distortion of said wire.

CHARLES PICINICH.